United States Patent Office 3,398,033
Patented Aug. 20, 1968

3,398,033
METHOD OF ETCHING SILICON CARBIDE
Leigh J. Haga, Bay City, and Thomas N. Tucker, Freeland, Mich., assignors to Dow Corning Corporation, Midland, Mich., a corporation of Michigan
No Drawing. Filed Feb. 26, 1965, Ser. No. 435,674
2 Claims. (Cl. 156—17)

ABSTRACT OF THE DISCLOSURE

A method of removing silicon carbide from a silicon surface by etching is disclosed. The silicon carbide is heated and then exposed to a halogen-oxygen mixture. This mixture causes deterioration of the silicon carbide and tends to make it porous. Treatment by HF-HNO$_3$ etching removes the remaining silicon carbide from the silicon after the silicon carbide has become porous.

---

The present invention relates to etching of silicon carbide, and more particularly to removal of silicon carbide and other contaminants from a silicon surface.

In the manufacture of semiconductor devices, it is known that silicon carbide in homogeneous form may be deposited on silicon carriers. See, for example, U.S. Patent No. 3,157,541. A problem arises, however, when silicon carbide has been deposited over an area where it is unwanted. Due to the fact that it is chemically inert with respect to most known etchants and is also extremely hard, it has heretofore been extremely difficult, if not impossible as a practical matter, to remove it.

An object of the present invention, therefore, is the provision of a practical method for removing homogeneous silicon carbide from carrier surfaces on which it is unwanted. More particularly, it is an object of the present invention to provide a method of etching or removing homogeneous silicon carbide from silicon surfaces.

In accordance with these and other objects it has been found that silicon carbide and other surface contaminants may be removed from silicon crystal surfaces by use of a halogen-oxygen mixture at elevated temperatures.

The invention will become better understood, and other objects and advantages made obvious to those skilled in the art, by a consideration of the following detailed description of specific embodiments.

Starting, for example, with a section of silicon dendritic web crystal on which a layer of silicon carbide has been deposited and is to be removed, the section is first heated in a reaction chamber to a temperature of between about 1200° C. and 1300° C. if chlorine is to be used, and between about 300° C. and 400° C. if fluorine is to be used. A mixture of Cl$_2$ and O$_2$, or fluorine and oxygen is then flowed into the chamber. This mixture may vary in percentages by volume of from 10% to 60% chlorine and from 5% to 50% fluorine. Optimum percentages were found to be 25% chlorine or 15% fluorine, although satisfactory results were obtained over the ranges indicated above. The flow rate is not critical; however, the time required for etching is dependent thereon. A flow rate of 500 cc. per minute of the mixture has been found to be satisfactory. The halogen-oxygen mixture acts to etch the silicon carbide. The reaction is believed to be of the form:

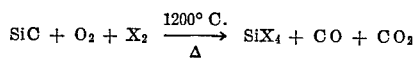

where X is chlorine or fluorine. While slight etching effects have been achieved with bromine, it is believed that even at high temperatures and concentrations the result is unsatisfactory for practical application.

The halogen-oxygen etch causes deterioration of the SiC and tends to make the silicon carbide layer porous and susceptible to final treatment by HF-HNO$_3$ etching to remove the remaining portions after porosity has been achieved. This is often desirable, rather than proceeding with the halogen-oxygen etch to remove all silicon carbide, due to the rapid attack of the silicon carrier by the halogen-oxygen mixture after porosity of the silicon carbide has been achieved. The HF-HNO$_3$ ratio may vary substantially, but a 1:1 ratio has been found satisfactory. If desired, acetic acid may be used as a buffer to slow the etching speed.

The following specific examples are illustrative of the invention.

Example 1.—A section of dendritic web silicon crystal having a one mil layer of silicon carbide thereon was placed in a reaction chamber and heated by resistance heating to 1200° C. An etch mixture of 25% chlorine to 75% oxygen, by volume, was fed into the reaction chamber at a flow rate of 500 cc./min. for two hours. The silicon carbide layer at that point was found to be deteriorated and porous. The surface was then treated with a mixture of 1 part HF and 1 part HNO$_3$ to remove the remaining silicon carbide. Results were satisfactory.

Example 2.—Under the conditions of Example 1, when the concentration of chlorine in the etch mixture was increased to 50%, etching time to achieve porosity sufficient to remove the remaining silicon carbide by HF-HNO$_3$ treatment was reduced to 45 minutes. However, some pinholing of the silicon surface was noted.

Example 3.—Under the conditions of Example 1, fluorine was substituted for chlorine in the etch mixture and various runs were made at concentrations ranging from 1% to 100% fluorine. Etching time was found to be reducible to 30 minutes with satisfactory results obtainable at percentages between 5% and 50% by volume.

Various modifications and variations are possible and will become obvious to those skilled in the art from a consideration of the foregoing. It is therefore to be understood that within the scope of the appended claims the invention may be practiced, otherwise than as specifically described.

That which is claimed is:
1. A method of removing silicon carbide from a silicon surface comprising:
   placing said silicon carbide coated silicon surface in a reaction chamber,
   heating said silicon carbide to a temperature of not less than 1200° C. and not greater than 1300° C., feeding into said reaction chamber at a predetermined rate a mixture of oxygen and chlorine, said mixture having by volume not less than 10% nor more than 60% chlorine,
   allowing said oxygen-chlorine mixture to react with said silicon carbide at said temperature, thereby causing deterioration and porosity in said silicon carbide, and
   treating said silicon carbide and silicon surface with an HF-HNO$_3$ mixture after said reaction between said silicon carbide and said oxygen and chlorine mixture, whereby said deteriorated and porous silicon carbide is removed from said silicon surface.

2. A method of removing silicon carbide from a silicon surface comprising:
   placing said silicon carbide coated silicon surface in a reaction chamber,
   heating said silicon carbide to a temperature of not less than 300° C. and not greater than 400° C.,
   feeding into said reaction chamber at a predetermined rate a mixture of oxygen and fluorine, said mixture having by volume not less than 5% nor more than 50% fluorine, allowing said oxygen-fluorine mixture to react with said silicon carbide at said temperature, thereby causing deterioration and porosity in said silicon carbide, and treating said silicon carbide and silicon surface with an HF-HNO$_3$ mixture after said reaction between said silicon carbide and said oxygen and fluorine mixture, whereby said deteriorated and porous silicon carbide is removed from said silicon surface.

References Cited
UNITED STATES PATENTS

| | | | |
|---|---|---|---|
| 2,739,041 | 3/1956 | Andersen | 23—205 |
| 2,740,700 | 4/1956 | Fuller | 156—17 |

JACOB H. STEINBERG, *Primary Examiner.*